(12) United States Patent
Kamioka

(10) Patent No.: US 8,689,954 B2
(45) Date of Patent: Apr. 8, 2014

(54) VEHICLE SUSPENSION SYSTEM

(75) Inventor: Takamasa Kamioka, Iwata (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 967 days.

(21) Appl. No.: 11/779,781

(22) Filed: Jul. 18, 2007

(65) Prior Publication Data

US 2008/0018028 A1    Jan. 24, 2008

(30) Foreign Application Priority Data

Jul. 20, 2006   (JP) ................................ 2006-197521

(51) Int. Cl.
*F16F 9/04*   (2006.01)

(52) U.S. Cl.
USPC .............. 188/322.21; 188/322.13; 267/64.28; 267/64.26

(58) Field of Classification Search
USPC .................... 188/270, 322.13, 322.15, 322.2, 188/322.21, 313; 267/118, 124, 64.28, 267/64.26, 64.11
See application file for complete search history.

(56) References Cited

U.S. PATENT DOCUMENTS

| | | | |
|---|---|---|---|
| 1,085,818 A | 2/1914 | Oxnard | |
| 1,151,595 A | 8/1915 | Ingham | |
| 1,923,011 A * | 8/1933 | Moulton | 188/301 |
| 3,000,625 A | 9/1961 | Polhemus | |
| 3,281,138 A * | 10/1966 | Oster | 267/124 |
| 3,348,835 A * | 10/1967 | Casey | 267/64.14 |
| 3,694,111 A * | 9/1972 | Braun | 417/491 |
| 3,797,615 A * | 3/1974 | Stembridge | 188/285 |
| 4,168,800 A * | 9/1979 | Quick | 239/164 |
| 4,647,025 A * | 3/1987 | Gold | 267/64.27 |
| 4,650,212 A * | 3/1987 | Yoshimura | 280/5.503 |
| 5,570,761 A * | 11/1996 | Paton | 188/271 |
| 5,669,597 A | 9/1997 | Rittstieg et al. | |
| 6,095,541 A | 8/2000 | Turner et al. | |
| 6,135,434 A | 10/2000 | Marking | |
| 6,360,857 B1 * | 3/2002 | Fox et al. | 188/281 |
| 6,659,241 B2 * | 12/2003 | Sendrea | 188/314 |
| 7,017,720 B2 * | 3/2006 | Yoshimoto | 188/315 |
| 2006/0054437 A1 * | 3/2006 | Furuya | 188/322.13 |

FOREIGN PATENT DOCUMENTS

| | | |
|---|---|---|
| DE | 1 046 511 B | 12/1958 |
| DE | 44 01 770 A1 | 8/1995 |
| DE | 195 05 026 A1 | 8/1996 |
| EP | 1 249 357 A2 | 10/2002 |
| EP | 1 422 438 A1 | 5/2004 |
| JP | P2001-501155 | 1/2001 |

OTHER PUBLICATIONS

Official Communication issued in corresponding European Patent Application No. 07252748, completed on Nov. 26, 2009.

* cited by examiner

*Primary Examiner* — Anna Momper

(74) *Attorney, Agent, or Firm* — Keating & Bennett, LLP

(57) ABSTRACT

A vehicle suspension system that inhibits a pressure within a gas chamber from reducing below a threshold value. In one arrangement, the suspension system includes a shock absorber associated with a motorcycle. The shock absorber includes an upper gas chamber that is filled with air. An air pressure adjustment valve operates to supply air into the upper gas chamber from a supply of air outside of the shock absorber when the air pressure in the upper gas chamber becomes smaller than a lower threshold value.

15 Claims, 8 Drawing Sheets

VEHICLE SUSPENSION SYSTEM

RELATED APPLICATIONS

This application is related to, and claims priority from, Japanese Patent Application No. 2006-197521, filed Jul. 20, 2006, the entire contents of which are hereby incorporated by reference herein and made a part of the present specification.

BACKGROUND OF THE INVENTION

1. Field of the Invention

The present invention relates to a vehicle and, more particularly, to a vehicle provided with a suspension system.

2. Description of the Related Art

Suspension systems for use in vehicles are known. For example, Japanese Patent Publication No. 2001-501155 illustrates a vehicle suspension system that includes a tubular member (e.g., an outer tube member) that has a gas chamber filled with air inside, and a piston that is disposed inside the tubular member. This suspension system is structured such that, when the suspension system extends and compresses, the air in the gas chamber is compressed or expands to generate reaction force.

SUMMARY OF THE INVENTION

However, in the suspension system disclosed in Japanese Patent Publication No. 2001-501155, in order to increase the reaction force of the suspension system, normally, high pressure air is filled into the gas chamber. An aspect of the present invention involves the realization that, when high pressure air is filled into the gas chamber in this manner, it is difficult to completely prevent air in the gas chamber from leaking to the outside of the suspension system. As a result, air gradually leaks to the outside of the suspension system from the gas chamber. Accordingly, over a period of time, the air pressure in the gas chamber reduces.

Preferred embodiments of the present invention have been devised in light of the above-described problems and an object of a preferred embodiment is to provide a vehicle having a suspension system that can inhibit the air pressure in a gas chamber from reducing below a predetermined value.

A preferred embodiment involves a vehicle provided with a vehicle body, a vehicle wheel, and a shock absorber that is provided between the vehicle body and the vehicle wheel. In addition, the shock absorber includes a gas chamber that is filled with air, and at least a first air pressure adjustment valve that operates to introduce air into the gas chamber from outside of the shock absorber when the air pressure in the gas chamber is smaller than a lower threshold value. Advantageously, with such an arrangement, when the air pressure in the gas chamber becomes smaller than the predetermined value due to the air from the gas chamber gradually leaking to the outside of the shock absorber, the air pressure adjustment valve introduces air into the gas chamber from the outside of the suspension system. Accordingly, it is possible to inhibit the air pressure in the gas chamber from reducing below a threshold value.

Another preferred embodiment is a vehicle as described above, in which the first air pressure adjustment valve of the shock absorber operates to introduce air into the gas chamber from outside of the shock absorber by extension and compression of the shock absorber. With such an arrangement, when the shock absorber extends and contracts due to bumps and dips in a road surface on which the vehicle is running, air is automatically sucked into the gas chamber from the outside of the shock absorber. Thus, it is possible to easily inhibit the air pressure in the gas chamber from reducing below the threshold value.

Yet another preferred embodiment is a vehicle as described above, in which the first air pressure adjustment valve of the shock absorber includes a first check valve. With such an arrangement, when the air pressure in the gas chamber becomes smaller than the threshold value, the first check valve allows air to be easily introduced into the gas chamber from the outside of the shock absorber. In addition, it is possible to inhibit back flow of the air that is introduced into the gas chamber.

Still another preferred embodiment is a vehicle as described above, in which the gas chamber includes a first gas chamber filled with air that is compressed when the shock absorber extends, and that expands when the shock absorber is compressed, and a second gas chamber filled with air that expands when the shock absorber extends, and that is compressed when the shock absorber is compressed. With such an arrangement, when the shock absorber extends and is compressed, the air in the first gas chamber and the second gas chamber is compressed and expands, whereby it is easy to generate a reaction force. Accordingly, shock that occurs when the vehicle body and the vehicle wheel move relative to each can be absorbed.

Another preferred embodiment is a vehicle as described above, in which the shock absorber includes an outer tube member, a shaft member that is moveably inserted inside the outer tube member, and a first piston that is attached to the shaft member. In addition, it is preferable that the first gas chamber defined by a space that is bounded by at least an inner surface of the outer tube member, an outer surface of the shaft member, and the first piston. Moreover, it is preferable that the second gas chamber is defined by a space that is bounded by at least the inner surface of the outer tube member and the first piston. With such an arrangement, the first gas chamber and the second gas chamber can easily be provided.

In another preferred embodiment, the shaft member of a vehicle as described above includes an oil chamber filled with oil, and that the shock absorber further includes a second piston disposed within the oil chamber of the shaft member. With such an arrangement, when the shock absorber extends and compresses, the second piston moves inside the oil chamber of the shaft member and generates damping force. Accordingly, it is possible to effectively generate a damping force.

Still another preferred embodiment is a vehicle as described above, in which the first gas chamber is preferably connected to the outside of the shock absorber via the first air pressure adjustment valve. With such an arrangement, air can be introduced into the first gas chamber from the outside of the shock absorber by the first air pressure adjustment valve, whereby it is possible to inhibit the air pressure in the first gas chamber becoming smaller than the threshold value.

Yet another preferred embodiment is a vehicle as described above, in which air is introduced into the first gas chamber from the outside of the shock absorber in the case that the air pressure in the first gas chamber becomes less than a threshold value as a result of the air in the first gas chamber expanding when the shock absorber is compressed. With such an arrangement, it is easy for air to be automatically introduced into the first gas chamber from the outside of the shock absorber when the shock absorber is compressed.

Another preferred embodiment is a vehicle as described above, in which the shock absorber further includes second air pressure adjustment valve that supplies air to the second gas chamber from the first gas chamber, and that when the air pressure in the second gas chamber becomes less than the air pressure in the first gas chamber as a result of expansion of the air in the second gas chamber when the shock absorber extends, air is supplied from the first gas chamber to the second gas chamber via the second air pressure adjustment valve. With such an arrangement, when the air pressure in the second gas chamber becomes less than the air pressure in the first gas chamber, it is possible for air to be supplied to the second gas chamber from the first gas chamber by the second air pressure adjustment valve. As a result, it is possible to inhibit the air pressure in the second gas chamber from becoming smaller than a threshold value.

Yet another preferred embodiment is a vehicle as described above, in which the second air pressure adjustment valve of the shock absorber preferably includes a second check valve. With such an arrangement, when the air pressure in the second gas chamber becomes smaller than the air pressure in the first gas chamber, the second check valve allows air to be easily supplied from the first gas chamber to the second gas chamber. In addition, it is possible to inhibit back flow of the air that is supplied from the first gas chamber to the second gas chamber.

Still another preferred embodiment is a vehicle as described above, in which the shock absorber further includes third air pressure adjustment valve that discharges air from the first gas chamber to the outside of the shock absorber. With such an arrangement, when the air pressure in the first gas chamber becomes larger than a threshold value as a result of the air in the first gas chamber being compressed when the shock absorber extends, air is discharged from the first gas chamber to the outside of the shock absorber via the third air pressure adjustment valve. As a result, it is possible to inhibit the air pressure in the first gas chamber from becoming larger than the threshold value.

Another preferred embodiment is a vehicle as described above, in which the third air pressure adjustment valve preferably includes a third check valve. With such an arrangement, when the air pressure in the first gas chamber becomes larger than the threshold value, the third check valve allows air to be easily discharged to the outside of the shock absorber from the first gas chamber. In addition, it is possible to inhibit back flow of the air that is discharged to the outside of the shock absorber from the first gas chamber.

Yet another preferred embodiment is a vehicle as described above, in which the third air pressure adjustment valve preferably has an adjustment member that adjusts the threshold value of the air pressure at which the air in the first gas chamber is discharged to the outside of the shock absorber via the third air pressure adjustment valve. With such an arrangement, it is possible for the adjustment member to adjust the air pressure in the first gas chamber, whereby it is possible to inhibit the air pressure in the first gas chamber from becoming too high or too low.

It is preferable that the shock absorber of the above-described vehicles is a portion of a rear wheel suspension system. With such an arrangement, it is possible to inhibit the air pressure in the gas chamber of the rear suspension from becoming smaller than a threshold value. However, the concepts of the preferred embodiments may be applied to front wheel suspension systems, or other applications, as well.

BRIEF DESCRIPTION OF THE DRAWINGS

These and other features, aspects and advantages of the present invention are described below with reference to drawings of preferred embodiments, which are intended to illustrate but not to limit the present invention. The drawings contain eight (8) figures.

DETAILED DESCRIPTION OF THE PREFERRED EMBODIMENTS

Figure 1:
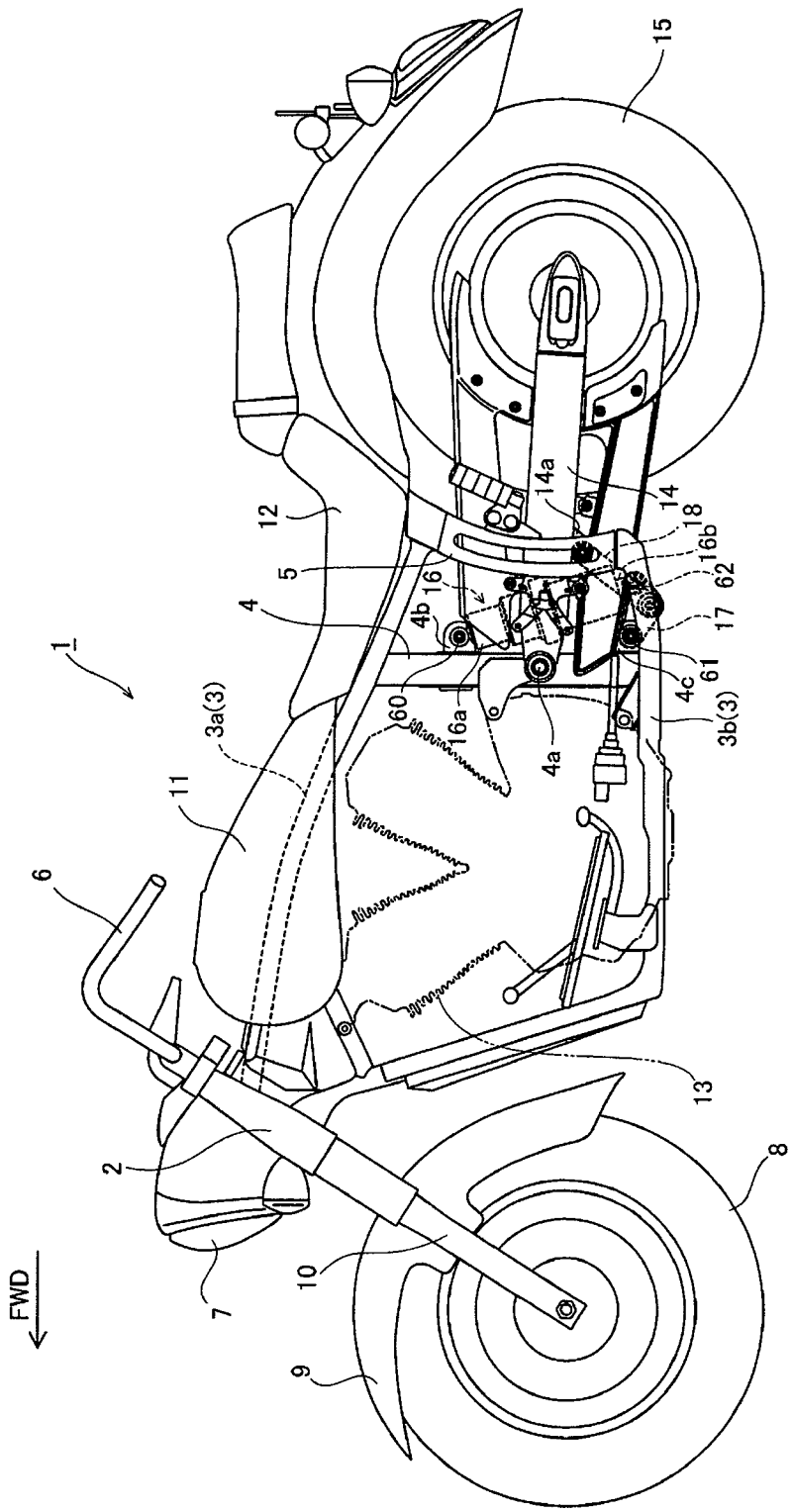
FIG. 1 is a side view showing the overall structure of a motorcycle incorporating a rear suspension having certain features, aspects and advantages of the present invention.
Figure 2:
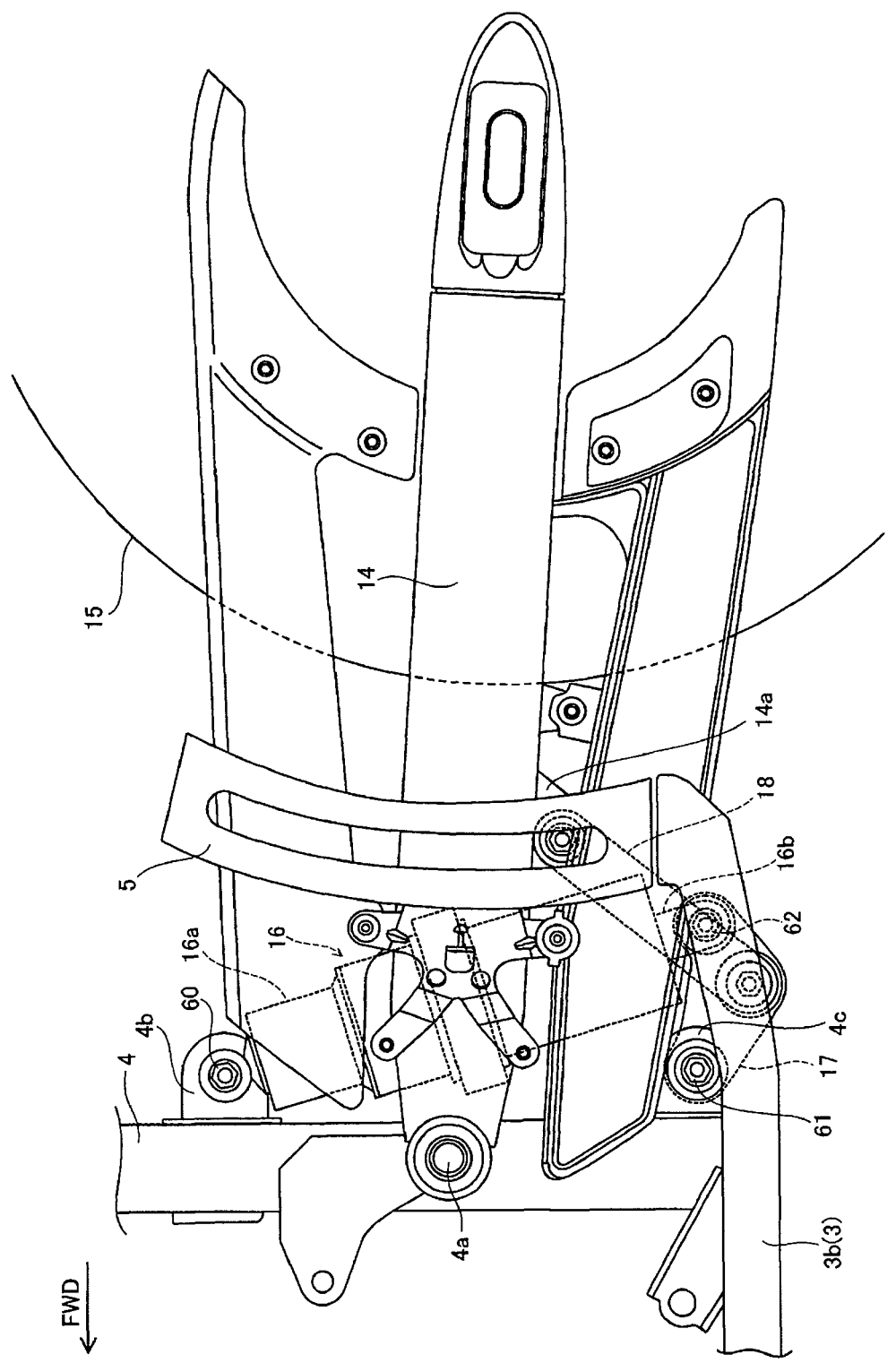
FIG. 2 illustrates in more detail the rear suspension and portion of the motorcycle of FIG. 1 surrounding the rear suspension.
Figure 3:
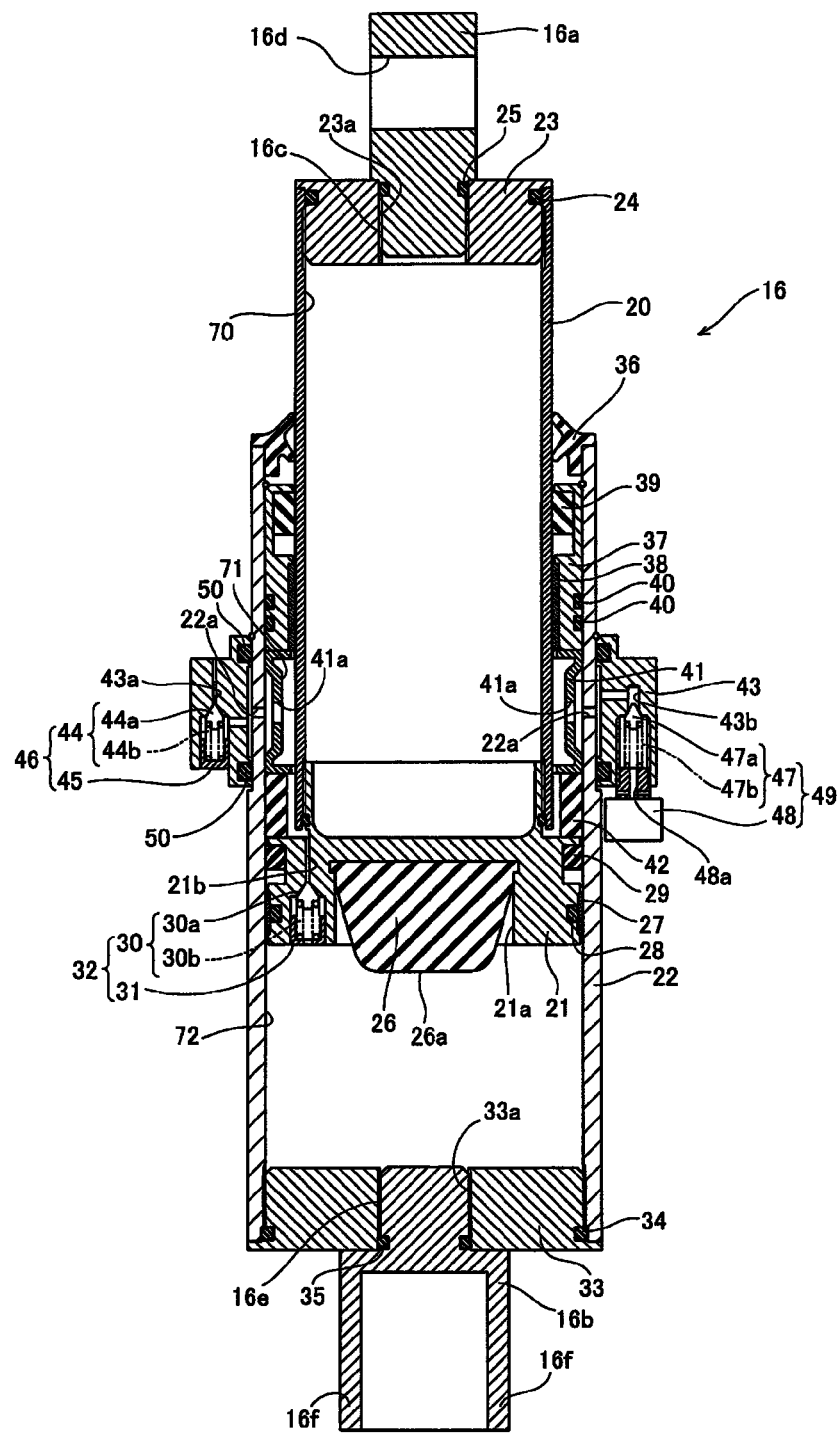
FIG. 3 is a cross-sectional view of a rear shock absorber of the rear suspension of the motorcycle of FIG. 1.
Figure 4:
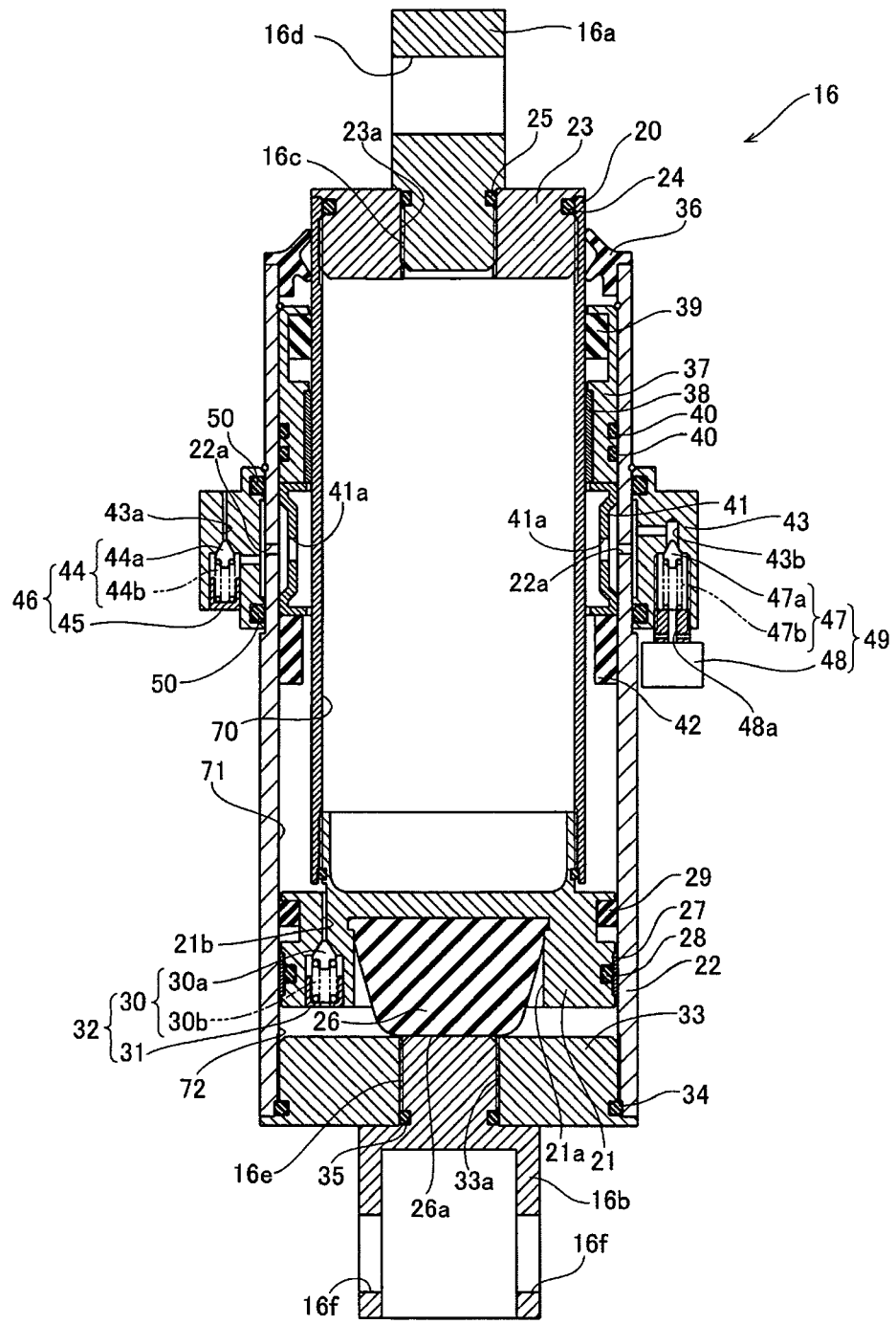
FIG. 4 is a cross-sectional view of the shock absorber of the rear suspension of the motorcycle of FIG. 1 in a different position than shown in FIG. 3.

FIG. 1 is a side view that shows the overall structure of a motorcycle incorporating a rear suspension having certain features, aspects and advantages of the present invention. FIG. 2 to FIG. 4 are figures that illustrate in detail the structure of a rear suspension of the motorcycle shown in FIG. 1. A motorcycle is one example of a vehicle that may incorporate a rear suspension having certain features, aspects and advantages of the present invention. In the figures, the FWD direction indicates the forward direction in which the vehicle normally travels. The structure of a motorcycle 1 incorporating a preferred rear suspension is described in more detail with reference to FIG. 1 to FIG. 4.

In the motorcycle 1 of FIG. 1, a main frame 3 extends in a front-to-rear direction is disposed to the rear of a head pipe 2. In addition, the main frame 3 includes an upper frame member 3a that extends rearward from the upper end portion of the head pipe 2 and a lower frame member 3b that extends rearward from a lower end portion of the head pipe 2. A rear section of the upper frame member 3a and a rear section of the lower frame member 3b are connected to a pivot shaft bearing member 4 and a connecting member 5. In the illustrated arrangement, a body frame, or vehicle body, of the motorcycle 1 includes the head pipe 2, the main frame 3, the pivot shaft bearing member 4, and the connecting member 5.

In addition, a handlebar 6 is attached to an upper section of the head pipe 2. Moreover, a front headlight 7 is provided to the front of the head pipe 2. A front wheel 8 and a front fender 9 disposed above the front wheel 8 are provided below the head pipe 2. The front wheel 8 is rotatably attached to lower end portions of a front fork 10. Furthermore, the front fork 10 has a shock absorbing function that absorbs shock that occurs when the front wheel 8 and the vehicle body move relative to each other.

A fuel tank 11 is supported by the upper frame member 3a of the main frame 3. In addition, a seat 12 is disposed to the rear of the fuel tank 11. An engine 13 is disposed below the upper frame member 3a of the main frame 3. Furthermore, as shown in FIG. 2, a pivot shaft 4a is supported by the pivot shaft bearing member 4. A rear arm 14 is swingably supported at a front end portion thereof by the pivot shaft 4a such that the rear arm 14 can swing upward and downward relative to the vehicle body. A rear wheel 15 is rotatably attached to a rear end section of the rear arm 14. Note that, the rear wheel 15 is one example of a "vehicle wheel."

In addition, a support member 4b is supported by, and extends rearward from, the pivot shaft bearing member 4 at a location above the pivot shaft 4a. An upper attachment member 16a of a rear shock absorber 16 is attached to the support member 4b using support member having a shaft, such as a bolt 60. Note that, the rear suspension member, or rear shock absorber 16, is one example of a "suspension system" of the preferred embodiments of the present invention. Furthermore, a support member 4c is supported by, and extends rearward from, a lower portion of the pivot shaft bearing member 4. A swinging linkage member 17 is swingably attached to the support member 4c by a support member having a shaft, such as a bolt 61. A lower attachment member 16b of the rear shock absorber 16 is attached to the swinging member 17 by a support member having a shaft, such as a bolt 62. Furthermore, the swinging member 17 is connected to a support member 14a of the rear arm 14 by a connecting linkage member 18. As a result, when the rear arm 14 swings upwards and downwards, the swinging member 17 swings centering on the support member 4c of the pivot shaft bearing member 4, whereby the rear shock absorber 16 extends and compresses.

In addition, the rear shock absorber 16, as can be seen in FIG. 3 and FIG. 4, includes a first member, which is a piston tube or shaft member, or piston rod ("rod 20"), a piston 21, and a second member or outer tube member 22. The illustrated rod 20 has a cylindrical shape and is fixed to the upper attachment member 16a. The piston 21 is attached to the rod 20, and the rod 20 and the piston 21 are disposed inside of the outer tube member 22, which is fixed to the lower attachment member 16b. The rod 20 is one example of a "shaft member" and the piston 21 is one example of a "first piston member."

Furthermore, an upper cap 23 is fixed to an upper end portion of the rod 20 so as to close the opening at the upper portion of the rod 20. In addition, a seal 24, which in the illustrated arrangement is an O-ring made of rubber, is disposed between an inner surface of the rod 20 and an outer surface of the upper cap 23. Moreover, a threaded member 16c extends from a lower surface of the upper attachment member 16a is screwed into a threaded hole 23a of the upper cap 23 in order to fix the upper attachment member 16a to the upper cap 23. A through-hole 16d extends in a lateral direction through the upper attachment member 16a. The bolt 60 (refer to FIG. 2) is inserted in the through-hole 16d, whereby the upper attachment member 16a is attached to the support member 4b of the pivot shaft bearing member 4 (refer to FIG. 2). In addition, a seal 25, which in the illustrated arrangement is an O-ring made of rubber, is disposed between an inner surface of the bolt hole 23a of the upper cap 23 and the outer surface of the lower section of the upper attachment member 16a.

Moreover, the piston 21 is fixed to the inner surface of the lower end section of the rod 20. An internal gas (or air) chamber 70 is filled with a gas (e.g., air) at an air pressure of around 1 atm ($1.013\times10^5$ Pa). The gas chamber 70 is generally defined by a space between the rod 20 and the outer tube member 22 in the illustrated arrangement. Furthermore, the piston 21 divides the gas chamber 70 into an upper gas chamber 71 disposed on an upper side of the piston 21, and a lower gas chamber 72 disposed on a lower side of the piston 21. More specifically, the upper gas chamber 71 is defined by a space surrounded by the inner surface of the outer tube member 22, the outer surface of the rod 20, and the piston 21. The lower gas chamber 72 is defined by a space surrounded by the inner surface of the outer tube member 22, the piston 21 and a lower cap 33, described hereinafter. The upper gas chamber 71 is also referred to as a "gas chamber" and a "first gas chamber" herein, and the lower gas chamber 72 is referred to as a "gas chamber" and a "second gas chamber" herein. The upper gas chamber 71 is structured such that the air is compressed when the rear shock absorber 16 extends (the state shown in FIG. 3) and the air is allowed to expand when the rear shock absorber 16 is compressed (the state shown in FIG. 4). In addition, the lower gas chamber 72 is structured such that the air is allowed to expand when the rear shock absorber 16 extends, and the air is compressed when the rear shock absorber 16 is compressed. In addition, the upper gas chamber 71 and the lower gas chamber 72 have an air pressure of around 9 atm ($9\times1.013\times10^5$ Pa) when the rear shock absorber 16 extends (the state shown in FIG. 3). The air pressure in the upper gas chamber 71 and the lower gas chamber 72 can be selectively set to a different air pressure by changing the volume or the like of the upper gas chamber 71 and the lower gas chamber 72.

In addition, an attachment hole 21a is formed in a lower section of the piston 21, and a cushion member 26 is attached to the attachment hole 21a. The cushion member 26 is made from a resilient material, such as rubber, for example. A bottom surface 26a of the cushion member 26 is disposed to the lower side of a bottom surface of the piston 21, and when the rear shock absorber 16 is compressed, the bottom surface 26a of the cushion member 26 abuts against the lower cap 33. As a result, when the rear shock absorber 16 is compressed, it is possible to prevent the piston 21 from coming into direct contact with the lower cap 33.

Moreover, a bearing member, such as a bushing 27, is attached between the outer surface of the piston 21 and the inner surface of the outer tube member 22. As a result, the piston 21 can more easily move in the axial direction of the outer tube member 22 along the inner surface of the outer tube member 22. In addition, a seal 28, which in the illustrated arrangement is an O-ring made of rubber, is disposed between the outer surface of the piston 21 and the bearing 27. Furthermore, a seal 29 made of a suitable material, such as rubber, is disposed to the upper side of the seal 28 and between the outer surface of the piston 21 and the inner surface of the outer tube member 22. As a result of providing the seals 28 and 29, the air in the lower gas chamber 72 can be inhibited from leaking (moving) into the upper gas chamber 71. Note that, two or more of the seals 28 and 29 may be provided. In this case, the air in the lower gas chamber 72 can be more effectively inhibited from leaking (moving) to the upper gas chamber 71.

In the illustrated arrangement, the piston 21 is provided with an air passage 21b that connects the upper gas chamber 71, and the lower gas chamber 72. A check valve 30 and a stopper 31 are provided in the air passage 21b. The check valve 30 includes a valve member 30a that opens and closes the air passage 21b, and a biasing member, such as a compression coil spring 30b, that applies a force to the valve member 30a. The stopper 31 prevents the compression coil spring 30b from detaching from the piston 21. The check valve 30 (the valve member 30a, the compression coil spring 30b) and the stopper 31 structure an air pressure adjustment valve 32. Note that, the check valve 30 is also referred to as a "second check valve" herein, and the air pressure adjustment valve 32 is referred to as a "second air pressure adjustment valve" herein. In addition, the air pressure adjustment valve 32 is structured such that the compression coil spring 30b pushes the valve member 30a with a predetermined pushing force so that the air passage 21b is blocked. When the pressure of the air in the lower gas chamber 72 becomes sufficiently smaller than the pressure of the air in the upper gas chamber 71, the air pressure adjustment valve 32 opens the air passage 21b, whereby air is supplied from the upper gas chamber 71 to the lower gas chamber 72.

More specifically, the biasing force against the valve member 30a of the compression coil spring 30b is a small biasing force and preferably is just large enough to block the air passage 21b. Thus, because the biasing force of the spring 30b is set at such a low value, it can be effectively ignored with respect to the force required to open the check valve 30. As a result, when the rear shock absorber 16 extends, the capacity of the upper gas chamber 71 reduces and the air in the upper gas chamber 71 is compressed, while the capacity of the lower gas chamber 72 increases and the air in the lower gas chamber 72 expands. As a result, when the air pressure in the lower gas chamber 72 becomes less than the air pressure in the upper gas chamber 71, the valve member 30a moves toward the lower gas chamber 72, and air is supplied from the upper gas chamber 71 to the lower gas chamber 72.

In addition, the lower cap 33 is fixed to the lower end portion of the outer tube member 22 so as to close the opening at the lower end of the outer tube member 22. Furthermore, a seal 34, which in the illustrated arrangement is an O-ring made of rubber, is disposed between the inner surface of the outer tube member 22 and the outer surface of the lower cap 33. Moreover, a threaded member 16e that extends upward from an upper surface of the lower attachment member 16b is screwed into a threaded hole 33a of the lower cap 33 such that the lower attachment member 16b is fixed to the lower cap 33. An insertion hole 16f is provided in the lower attachment member 16b, and the above-described bolt 62 (refer to FIG. 2) is inserted in the insertion hole 16f. Accordingly, the lower attachment member 16b is attached to the swinging member 17. In addition, a seal 35, which in the illustrated arrangement is an O-ring made of rubber, is disposed between the inner surface of the threaded hole 33a of the lower cap 33 and the outer surface of the upper section of the lower attachment member 16b. The seals 34 and 35 inhibit air in the lower gas chamber 72 from leaking to the outside of the rear shock absorber 16. However, despite the presence of the seals 34 and 35, air can still permeate though the rubber seals 34 and 35 over time, so in the long term air will gradually leak to the outside of the rear shock absorber 16 from the lower gas chamber 72.

A dust seal 36 is attached to the upper end of the outer tube member 22 between the inner surface of the outer tube member 22 and the outer surface of the rod 20. The dust seal 36 inhibits entry of dirt or the like between the outer tube member 22 and the rod 20. Furthermore, a bearing support member 37 is fixed between the inner surface of the outer tube member 22 and the outer surface of the rod 20 below the dust seal 36. A solid bearing, or bushing 38, is attached between the inner surface of the bearing support member 37 and the outer surface of the rod 20. As a result, the rod 20 is able to move more easily in the axial direction of the outer tube member 22 along the inner surface of the outer tube member 22. In addition, a seal 39 made of a suitable sealing material, such as rubber, is disposed between the inner surface of the bearing support member 37 and the outer surface of the rod 20. Furthermore, two seals 40, which in the illustrated arrangement are O-rings made of rubber, are disposed between the outer surface of the bearing support member 37 and the inner surface of the outer tube member 22. These seals 39 and 40 inhibit air in the upper gas chamber 71 from leaking to the outside of the rear shock absorber 16. However, despite the presence of the seals 39 and 40, air can still permeate though the rubber made seals 39 and 40 over time, so in the long term air will gradually leak to the outside of the rear shock absorber 16 from the upper gas chamber 71.

A metal ring 41 and a cushion member 42 that is fixed to the lower section of the metal ring 41 are disposed below the bearing support member 37. When the rear shock absorber 16 extends, a bottom surface of the cushion member 42 abuts against an upper surface of the piston 21. As a result, when the rear shock absorber 16 extends, the piston 21 is prevented from directly coming into contact with the metal ring 41.

Air passage holes 41a and 22a are respectively formed in the metal ring 41 and the region of the outer tube member 22 where the metal ring 41 is fixed. In addition, a ring shaped member 43 is fixed to the outer periphery surface of the region of the outer tube member 22 where the metal ring 41 is fixed.

Furthermore, an air passage 43a and an air passage 43b are provided in the ring shaped member 43. The air passage 43a allows air to be sucked into the upper gas chamber 71 from the outside of the rear shock absorber 16. The air passage 43b allows air to be discharged to the outside of the rear shock absorber 16 from the upper gas chamber 71.

A check valve 44 and a stopper 45 are provided in the air passage 43a. The check valve 44 includes a valve member 44a that opens and closes the air passage 43a, and a biasing member, such as a compression coil spring 44b, that pushes the valve member 44a. The stopper 45 prevents the compression coil spring 44b from detaching from the ring shaped member 43. The check valve 44 (the valve member 44a, the compression coil spring 44b) and the stopper 45 form an air pressure adjustment valve 46. The check valve 44 may also be referred to as a "first check valve" herein, and the air pressure adjustment valve 46 is one example of a "first pressure adjustment valve." In addition, the air pressure adjustment valve 46 is structured such that the compression coil spring 44b pushes the valve member 44a with a predetermined pushing force so that the air passage 43a is blocked. When the pressure of the air in the upper gas chamber 71 becomes smaller than a threshold value, the air pressure adjustment valve 46 opens the air passage 43a, whereby air is sucked into the upper gas chamber 71 from outside of the rear shock absorber 16. Thus, the air outside the shock absorber 16 is a supply of air (or gas) that may be used to "refill" the upper gas chamber 71. However, in other arrangements, the supply of gas may be other than atmospheric air, such as a gas reservoir chamber, for example. Preferably, the "refill" air or gas originates from a supply of gas other than the lower gas chamber 72. In addition, although a check-valve-type arrangement is preferred, other suitable valve types may also be used.

More specifically, the pushing force against the valve member 44a of the compression coil spring 44b preferably is approximately the smallest pushing force that is sufficient to block the air passage 43a, and is set at a small pushing force that can be effectively ignored. As a result, when the rear shock absorber 16 is compressed, the capacity of the upper gas chamber 71 increases and the air in the upper gas chamber 71 expands. As a result, when the air pressure in the upper gas chamber 71 becomes less than the air pressure (atmospheric pressure) at the outside of the rear shock absorber 16, the valve member 44a moves to the upper gas chamber 71 side, and air is sucked into the side of the upper gas chamber 71 from outside of the rear shock absorber 16.

In addition, a check valve 47 and an adjustment screw 48 are provided in the air passage 43b. The check valve 47 includes a valve member 47a that opens and closes the air passage 43b, and a biasing member, such as a compression coil spring 47b that pushes the valve member 47a. The adjustment screw 48 prevents the compression coil spring 47b from detaching from the ring shaped member 43, and adjusts the air pressure value at which air is discharged from the upper gas chamber 71 to the outside of the rear shock absorber 16 by adjusting the biasing force of the compression coil spring 47b. The check valve 47 (the valve member 47a, the compression coil spring 47b) and the adjustment screw 48 structure an air pressure adjustment valve 49. The check valve 47 is one example of, and may be referred to herein as, a "third check valve," and the adjustment screw 48 is one example of an "adjustment member." In addition, the air pressure adjustment valve 49 is one example of, and may be referred to herein as, a "third air pressure adjustment valve." In addition, the air pressure adjustment valve 49 is structured such that the compression coil spring 47b pushes the valve member 47a with a predetermined pushing force so that the air passage 43b is blocked. When the pressure of the air in the upper gas chamber 71 becomes larger than the predetermined value, the air pressure adjustment valve 49 opens the air passage 43b, whereby air is discharged to the outside of the rear shock absorber 16 from the upper gas chamber 71.

More specifically, when the air pressure in the upper gas chamber 71 becomes larger than approximately 9 atm ($9 \times 1.013 \times 105$ Pa), the adjustment screw 48 is adjusted such that the air in the upper gas chamber 71 is discharged to the outside of the rear shock absorber 16. In addition, when the rear shock absorber 16 extends, the capacity of the upper gas chamber 71 reduces and the air in the upper gas chamber 71 is compressed. Accordingly, when the air pressure in the upper gas chamber 71 becomes more than approximately 9 atm ($9 \times 1.013 \times 105$ Pa), the valve member 47a opens, whereby air is discharged from the upper gas chamber 71 to the outside of the rear shock absorber 16. As a result, it is possible to inhibit the air pressure in the upper gas chamber 71 from becoming larger than the predetermined value (roughly 9 atm ($9 \times 1.013 \times 105$ Pa)). Note that, an air passage 48a is provided in the adjustment screw 48. Air that passes through the air passage 43b is discharged to the outside of the rear shock absorber 16 via the air passage 48a of the adjustment screw 48.

In addition, two seals 50, which in the illustrated arrangement are O-rings made of rubber, are disposed between the inner surface of the ring shaped member 43 and the outer surface of the outer tube member 22. As a result, air inside the air passages 43a and 43b is inhibited from leaking to the outside of the rear shock absorber 16.

Figure 5:
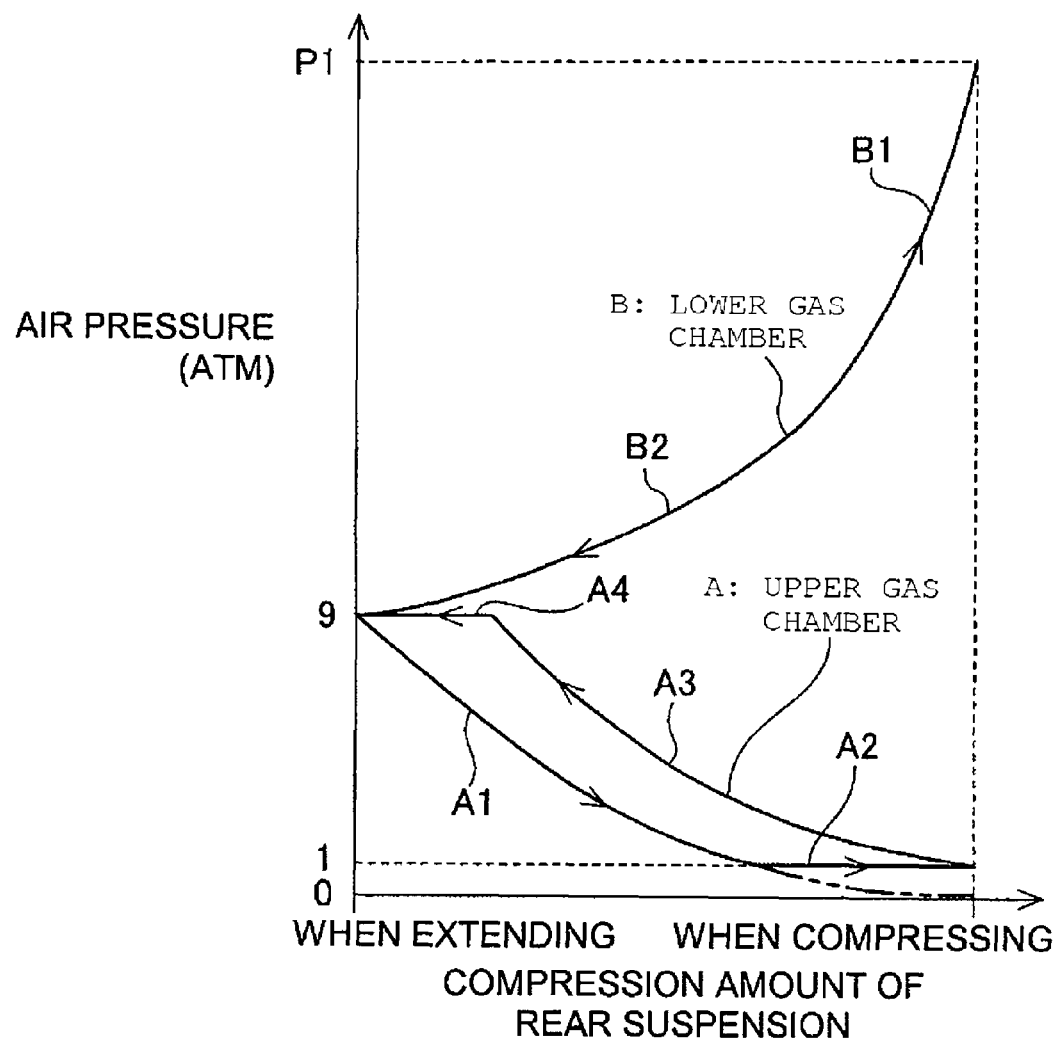
FIG. 5 is a position versus air pressure graph of the shock absorber of the rear suspension of the motorcycle of FIG. 1.
Figure 6:
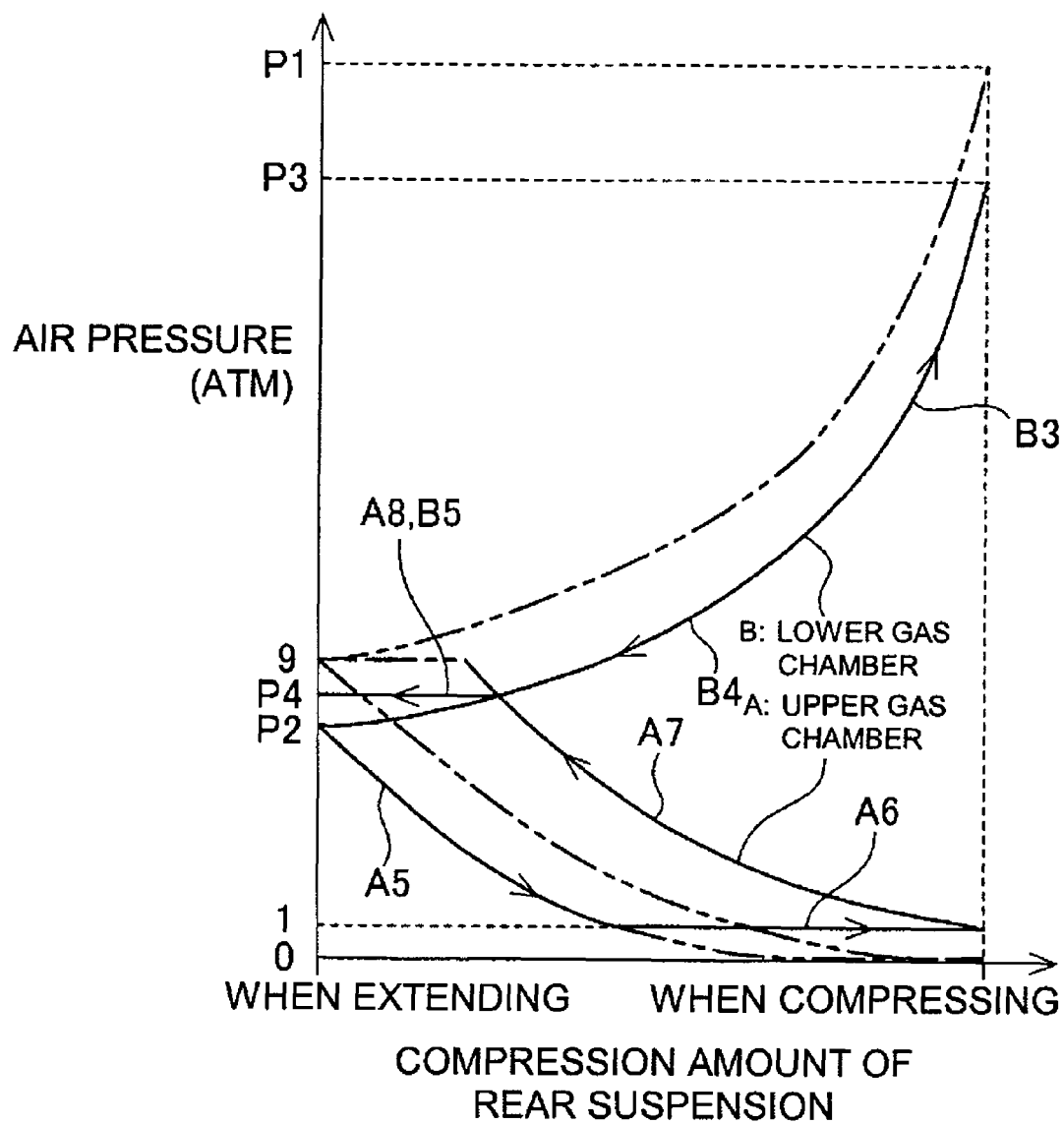
FIG. 6 is another position versus air pressure graph of the shock absorber of the rear suspension of the motorcycle of FIG. 1.

FIG. 5 and FIG. 6 are figures that illustrate the operation of the rear suspension of the motorcycle shown in FIG. 1. Operation of the rear shock absorber 16 of the motorcycle 1 is explained with reference to FIG. 3 to FIG. 6.

A description is first given about the situation when the air pressures in the upper gas chamber 71 and the lower gas chamber 72 are roughly 9 atm ($9 \times 1.013 \times 105$ Pa) and the rear shock absorber 16 is extended (the state shown in FIG. 3) (namely, when air in the upper gas chamber 71 and the lower gas chamber 72 hardly leaks to the outside of the rear shock absorber 16).

When force acts on the rear shock absorber 16 in a direction that compresses the rear shock absorber 16, the rear shock absorber 16 is compressed against resistance of the air pressure in the lower gas chamber 72. In this case, the capacity of the upper gas chamber 71 increases and the air in the upper gas chamber 71 expands, whereby the air pressure in the upper gas chamber 71 reduces to roughly 1 atm ($1.013 \times 105$ Pa) as shown by A1 in FIG. 5. In addition, as shown in FIG. 4, as a result of the rear shock absorber 16 being compressed still further, the air pressure in the upper gas chamber 71 becomes smaller than 1 atm ($1.013 \times 105$ Pa). At this time, the air pressure adjustment valve 46 causes air to be sucked into the upper gas chamber 71 from the outside of the rear shock absorber 16, whereby the air pressure in the upper gas chamber 71 is maintained at roughly 1 atm ($1.013 \times 105$ Pa), as shown by A2 in FIG. 5.

In addition, when the force acts on the rear shock absorber 16 in a direction that compresses the rear shock absorber 16, the rear shock absorber 16 compresses against the resistance of the air pressure in the lower gas chamber 72. In this case, the capacity of the lower gas chamber 72 reduces and the air in the lower gas chamber 72 is compressed, whereby the air pressure in the lower gas chamber 72 rises to P1 atm (approximately 10-40 or more atm) as shown by B1 in FIG. 5.

Next, when a force acts on the rear shock absorber 16 in a direction that extends the rear shock absorber 16, the rear shock absorber 16 extends. In this case, the capacity of the upper gas chamber 71 reduces and the air in the upper gas chamber 71 is compressed, whereby the air pressure in the upper gas chamber 71 increases to roughly 9 atm ($9 \times 1.013 \times 105$ Pa) as shown by A3 of FIG. 5. In addition, as shown in FIG. 3, when the rear shock absorber 16 extends still further, the air pressure in the upper gas chamber 71 becomes larger than roughly 9 atm ($9 \times 1.013 \times 105$ Pa). At this time, the air pressure adjustment valve 49 causes air to be discharged from the upper gas chamber 71 to the outside of the rear shock absorber 16, whereby the air pressure in the upper gas chamber 71 is maintained at roughly 9 atm ($9 \times 1.013 \times 105$ Pa), as shown by A4 in FIG. 5.

Moreover, when the force acts on the rear shock absorber 16 in the direction that extends the rear shock absorber 16, the rear shock absorber 16 extends. In this case, the capacity of the lower gas chamber 72 increases and the air in the lower gas chamber 72 expands, whereby the air pressure in the lower gas chamber 72 reduces to roughly 9 atm ($9 \times 1.013 \times 105$ Pa) as shown by B2 of FIG. 5.

Next, a description is provided about a situation in which the air pressures in the upper gas chamber 71 and the lower gas chamber 72 are P2 atm (less than roughly 9 atm ($9 \times 1.013 \times 105$ Pa)) (FIG. 6) and the rear shock absorber 16 is extended (the state shown in FIG. 3) (namely, when air has leaked from the upper gas chamber 71 and the lower gas chamber 72 to the outside of the rear shock absorber 16).

When force acts on the rear shock absorber 16 in a direction that compresses the rear shock absorber 16, the rear shock absorber 16 is compressed against resistance of the air pressure in the lower gas chamber 72. In this case, the capacity of the upper gas chamber 71 increases and the air in the upper gas chamber 71 expands, whereby the air pressure in the upper gas chamber 71 reduces to roughly 1 atm ($1.013 \times 105$ Pa) as shown by A5 in FIG. 6. In addition, as shown in FIG. 4, as a result of the rear shock absorber 16 being compressed still further, the air pressure in the upper gas chamber 71 becomes smaller than 1 atm ($1.013 \times 105$ Pa). At this time, the air pressure adjustment valve 46 causes air to be sucked into the upper gas chamber 71 from the outside of the rear shock absorber 16, whereby the air pressure in the upper gas chamber 71 is maintained at roughly 1 atm ($1.013 \times 105$ Pa), as shown by A6 in FIG. 6.

In addition, when the force acts on the rear shock absorber 16 in the direction that compresses the rear shock absorber 16, the rear shock absorber 16 compresses against the resistance of the air pressure in the lower gas chamber 72. In this case, the capacity of the lower gas chamber 72 reduces and the air in the lower gas chamber 72 is compressed, whereby the air pressure in the lower gas chamber 72 rises to P3 atm (which is less than P1 atm) as shown by B3 in FIG. 6.

Next, when a force acts on the rear shock absorber 16 in a direction that extends the rear shock absorber 16, the rear shock absorber 16 extends. In this case, the capacity of the upper gas chamber 71 reduces and the air in the upper gas chamber 71 is compressed, whereby the air pressure in the upper gas chamber 71 increases to roughly P4 atm, as shown by A7 of FIG. 6.

In addition, when the force acts on the rear shock absorber 16 in a direction that extends the rear shock absorber 16, the rear shock absorber 16 extends. In this case, the capacity of the lower gas chamber 72 increases and the air in the lower gas chamber 72 expands, whereby the air pressure in the lower gas chamber 72 reduces to P4 atm, as shown by B4 of FIG. 6.

In addition, as shown in FIG. 3, when the rear shock absorber 16 extends still further, air is supplied from the upper gas chamber 71 to the lower gas chamber 72 by the air pressure adjustment valve 32. At this time, the air pressures in the upper gas chamber 71 and the lower gas chamber 72 are maintained at P4 atm, as shown by A8 and B5 of FIG. 6. In other words, the air pressures within the upper gas chamber 71 and the lower gas chamber 72 are equalized.

After this, when forces act on the rear shock absorber 16 in directions that alternately compress and extend the rear shock absorber 16, the air pressures in the upper gas chamber 71 and the lower gas chamber 72 rise from P4 atm to roughly 9 atm ($9 \times 1.013 \times 105$ Pa). In this manner, the air pressures in the upper gas chamber 71 and the lower gas chamber 72 can be maintained at roughly 9 atm ($9 \times 1.013 \times 105$ Pa) when the rear shock absorber 16 is extended.

In the rear suspension system as described above, the air pressure adjustment valve 46 is provided that functions such that, when the air in the upper gas chamber 71 has expanded due to the rear shock absorber 16 being compressed and the air pressure in the upper gas chamber 71 is less than the air pressure at the outside of the rear shock absorber 16, air is sucked into the upper gas chamber 71 from the outside of the rear shock absorber 16. As a result, in the case that the air pressure in the upper gas chamber 71 becomes smaller than the predetermined value due to the air in the upper gas chamber 71 gradually leaking to the outside of the rear shock absorber 16, the air pressure adjustment valve 46 allows air to be sucked into the upper gas chamber 71 from the outside of the rear shock absorber 16. Accordingly, it is possible to inhibit the air pressure in the upper gas chamber 71 from reducing below the predetermined value due to extension and compression of the rear shock absorber 16.

In addition, in the above-described rear suspension system, the air pressure adjustment valve 46 of the rear shock absorber 16 is structured such that air is sucked into the upper gas chamber 71 from the outside of the rear shock absorber 16 as a result of extension and compression of the rear shock absorber 16. Accordingly, when the rear shock absorber 16 extends and compresses due to bumps and dips in a road surface that are passed over while the vehicle is running, air is automatically sucked into the upper gas chamber 71 from the outside of the rear shock absorber 16. Thus, it is possible to easily inhibit the air pressure in the upper gas chamber 71 from reducing below the predetermined value.

Furthermore, the air pressure adjustment valve 32 functions such that, in the case that the air pressure in the lower gas chamber 72 becomes smaller than the air pressure in the upper gas chamber 71 due to expansion of the air in the lower gas chamber 72 when the rear shock absorber 16 extends, air is supplied to the lower gas chamber 72 from the upper gas chamber 71. As a result, the air pressure adjustment valve 32 allows air to be supplied from the upper gas chamber 71 to the lower gas chamber 72, whereby it is possible to inhibit the air pressure in the lower gas chamber 72 from reducing below the predetermined value.

Moreover, the air pressure adjustment valve 49 functions such that, in the case that the air pressure in the upper gas chamber 71 becomes more than roughly 9 atm ($9 \times 1.013 \times 105$ Pa) due to the air in the upper gas chamber 71 being compressed when the rear shock absorber 16 extends, air is discharged from the upper gas chamber 71 to the outside of the rear shock absorber 16. As a result, in the case that the air pressure in the upper gas chamber 71 becomes larger than roughly 9 atm ($9 \times 1.013 \times 105$ Pa), air can be discharged to the outside of the rear shock absorber 16 from the upper gas chamber 71. Accordingly, the air pressure in the upper gas chamber 71 can be inhibited from becoming more than roughly 9 atm ($9 \times 1.013 \times 105$ Pa).

Figure 7:
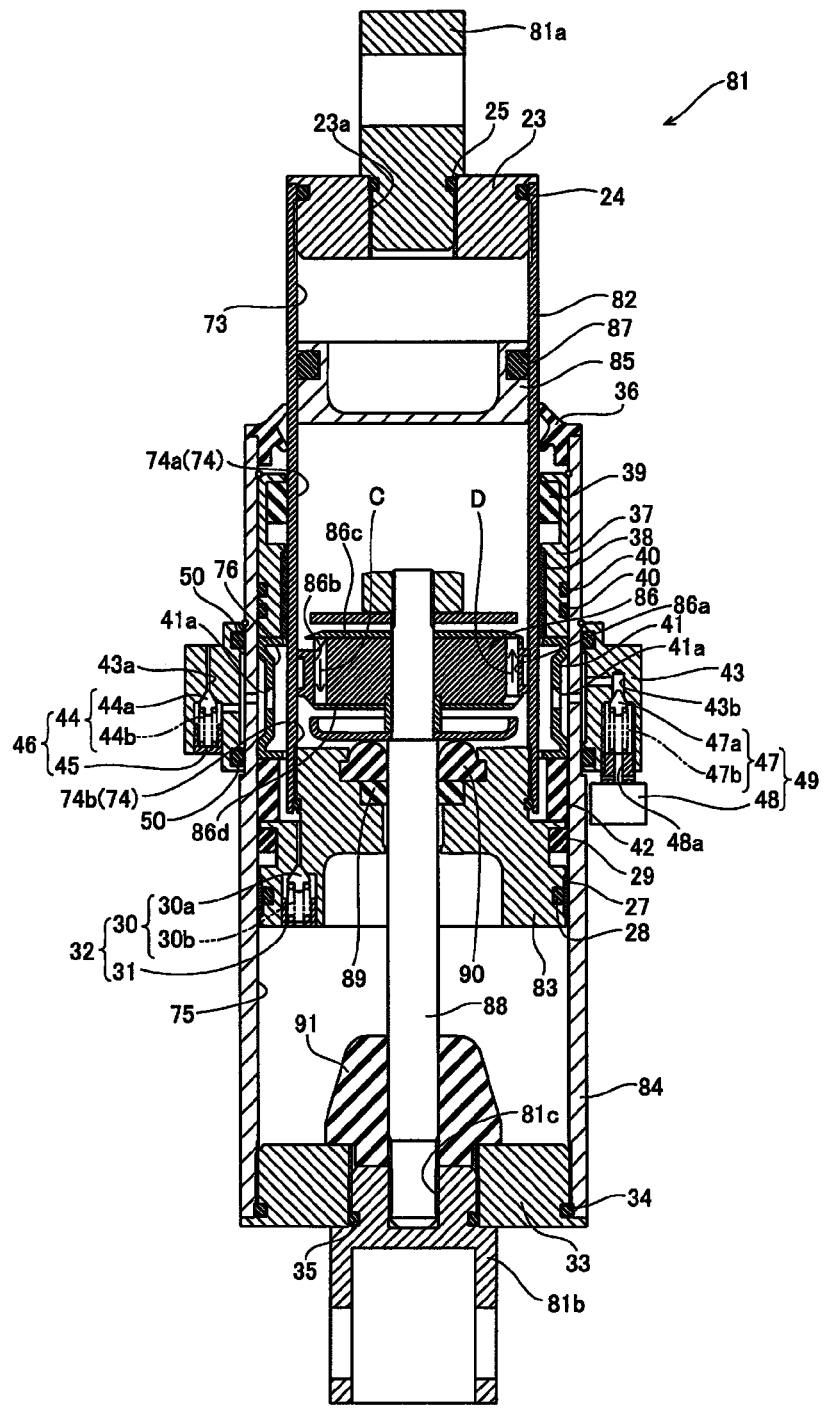
FIG. 7 is a cross-sectional view of a modification of the shock absorber of FIGS. 1-4.
Figure 8:
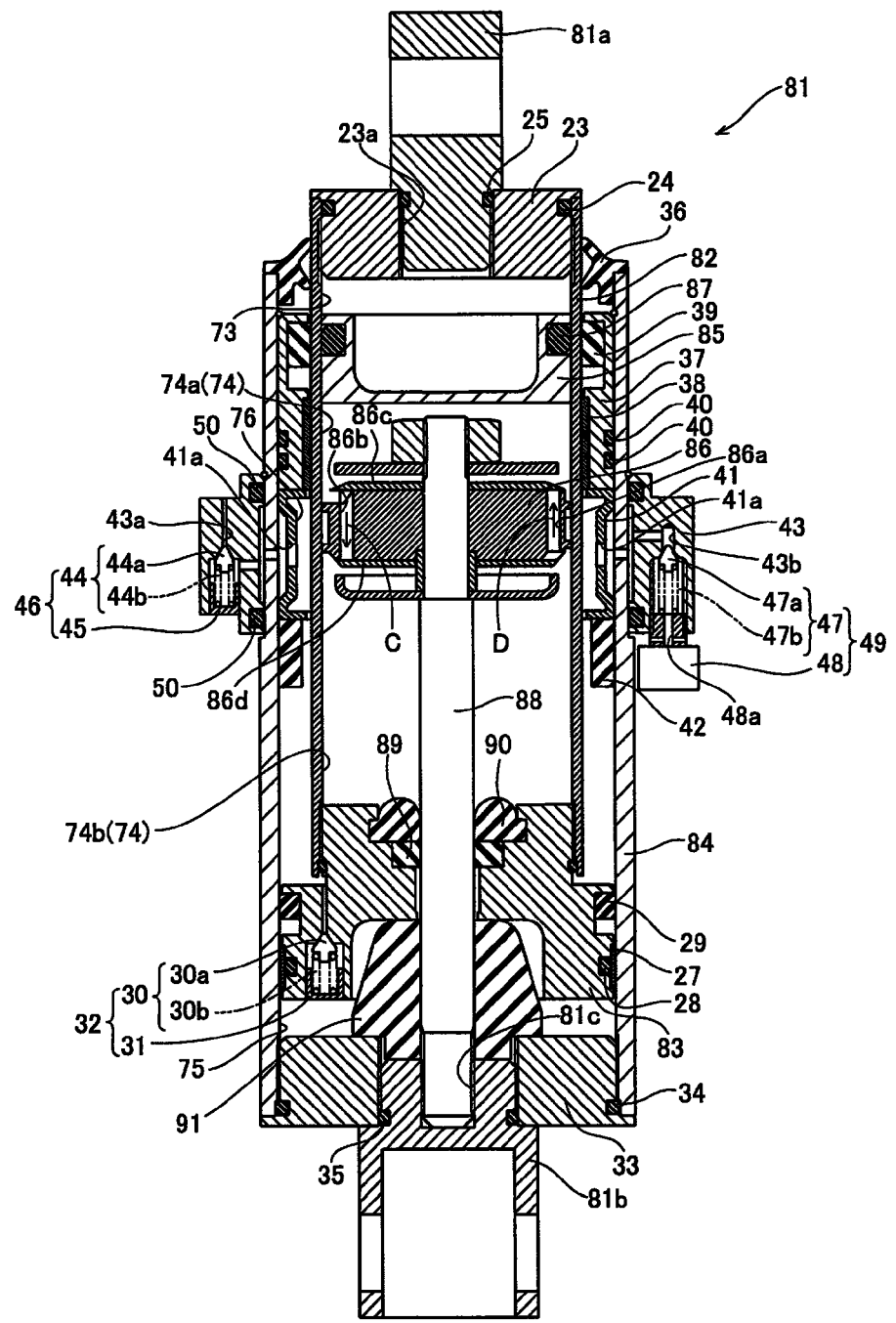
FIG. 8 is a cross-sectional view of the shock absorber of FIG. 7 in a different position that shown in FIG. 7.

FIG. 7 and FIG. 8 are figures that illustrate the structure of a rear suspension of a motorcycle that is a modification of the rear suspension described above with reference to FIGS. 1-6. In the rear suspension of FIGS. 7 and 8, a damping mechanism is provided.

A rear suspension 81, as shown in FIG. 7 and FIG. 8, includes a rod 82, a piston 83, and an outer tube member 84. The rod 82 has a cylindrical shape and is fixed to an upper attachment member 81*a*. The piston 83 at least partially defines a damping mechanism and is attached to a lower end portion of the rod 82. The rod 82 and the piston 83 are disposed inside of the outer tube member 84, which is fixed to the lower attachment member 81*b*. The rod 82 is one example of, and may be referred to herein as, a "shaft member" and the piston 83 is one example of, and may be referred to herein as, a "first piston member."

Pistons 85 and 86 are disposed inside of the rod 82. Furthermore, the inside of the rod 82 is divided into an inner gas chamber 73 disposed to the upper side of the piston 85 and an oil chamber 74 disposed to the lower side of the piston 85. The inner gas chamber 73 is filled with a gas, such as air or nitrogen, and the oil chamber 74 is filled with a suitable damping oil. In addition, the piston 86 divides the inside of the oil chamber 74 into an upper oil chamber 74*a* that is disposed above the piston 86 and a lower oil chamber 74*b* that is disposed below the piston 86. The piston 86 is one example of, and may be referred to herein as, a "second piston member."

Furthermore, a seal 87, which in the illustrated arrangement is an O-ring made of rubber, is disposed between the outer surface of the piston 85 and the inner surface of the rod 82. Moreover, the piston 85 can move in the axial direction of the rod 82 along the inner surface of the rod 82.

In addition, a plurality of orifices 86*a* and 86*b* are formed in the piston 86 and allow oil to pass axially through the piston 86. The plurality of orifices 86*a* function to allow oil in the lower oil chamber 74*b*, that is below the piston 86, to pass through to the upper oil chamber 74*a*. The plurality of orifices 86*b* function to allow oil in the upper oil chamber 74*a* to pass through to the lower oil chamber 74*b*, which is below the piston 86. In addition, a shim or washer 86*c* is disposed to the upper side of the plurality of orifices 86*a* and 86*b*, and blocks the upper surfaces of the orifices 86*a* while leaving the upper surfaces of the orifices 86*b* open. In addition, a shim or washer 86*d* is disposed to the lower side of the plurality of orifices 86*a* and 86*b*, and leaves the lower surfaces of the orifices 86*a* open, while closing the lower surfaces of the orifices 86*b*.

In addition, the piston 86 is fixed to a rod 88 that is fixed within a through-hole 81*c* of a lower attachment member 81*b*. As a result, when the rear suspension 81 extends and compresses, an outer surface of the piston 86 moves in the axial direction of the rod 82 along the inner surface of the rod 82.

Moreover, the piston 83 is provided in the lower end portion of the rod 82 and functions in the same manner as the piston 21 of the above-described rear suspension. More specifically, the air pressure adjustment valve 32 is provided in the piston 83. The air pressure adjustment valve 32 functions such that, in the case that the air pressure in a lower gas chamber 75 that is disposed to the lower side of the piston 83 becomes smaller than the air pressure in an upper gas chamber 76, air is supplied from the upper gas chamber 76 that is disposed above the piston 83 to the lower gas chamber 75. Note that, the lower gas chamber 75 is one example of, and may be referred to herein as, a "gas chamber" and a "second gas chamber" and the upper gas chamber 76 is one example of, and may be referred to herein as, a "gas chamber" and a "first gas chamber."

In addition, a seal 89 made of a suitable sealing material, such as rubber, is disposed between the inner surface of the piston 83 and the outer surface of the rod 88. Furthermore, a cushion member 90 is attached to an upper end of the piston 83. An upper surface of the cushion member 90 is disposed to the upper side of an upper surface of the piston 83, and when the rear suspension 81 extends (the state shown in FIG. 7), the upper surface of the cushion member 90 abuts against the piston 86. As a result, when the rear suspension 81 extends, it is possible to prevent the piston 83 from coming into direct contact with the piston 86. In addition, a cushion member 91 is attached to a lower end of the rod 88. An upper surface of the cushion rubber 91 is structured such that the upper surface of the cushion rubber 91 abuts against the piston 83 when the rear suspension 81 is compressed (the state shown in FIG. 8). As a result, when the rear suspension 81 is compressed, it is possible to prevent the piston 83 from coming into direct contact with the lower cap 33.

Preferably, the remaining structure of the shock absorber of FIGS. 7 and 8 is substantially the same as the structure of the shock absorber of FIGS. 1-6, and thus an explanation is omitted here.

The operation of the rear suspension 81 of the rear suspension is described with reference to FIG. 7 and FIG. 8. First, the situation when a force acts on the rear suspension 81 in a direction that compresses the rear suspension 81 is described. When force acts on the rear suspension 81 in the direction that compresses the rear suspension 81, the rear suspension 81 is compressed against resistance of the air pressure in the lower gas chamber 75, whereby a spring force is generated.

In addition, as shown in FIG. 8, when the rod 82 moves downwards with respect to the outer tube member 84 and the piston 86, the pressure of the upper oil chamber 74*a* increases, and the washer 86*d* of the piston 86 is opened. In addition, the oil inside the upper oil chamber 74*a* flows in the direction indicated by arrow C through the orifice 86*b* of the piston 86, and flows into the lower oil chamber 74*b*. Accordingly, a compression damping force is generated as a result of the resistance of the oil flowing through the orifice 86*b* of the piston 86.

Next, a situation in which a force acts on the rear suspension 81 in the direction that extends the rear suspension 81 is described. When force acts on the rear suspension 81 in the direction that causes the rear suspension 81 to extend, the rear suspension 81 extends, whereby a rebound damping force is generated.

More specifically, as shown in FIG. 7, when the rod 82 moves upwards with respect to the outer tube member 84 and the piston 86, the pressure of the lower oil chamber 74*b* increases, and the washer 86*c* of the piston 86 is opened. In addition, the oil inside the lower oil chamber 74*b* flows in the direction indicated by arrow D through the orifice 86*a* of the piston 86, and flows into the upper oil chamber 74*a*. At this time, a damping force is generated as a result of the resistance of the oil flowing through the orifice 86*a* of the piston 86.

Note that, the other parts of the operation of the rear suspension of FIGS. 7 and 8 are the same as the operation of the previously-described rear suspension of FIGS. 1-6. More specifically, when the air pressure in the upper gas chamber 76 becomes smaller than the air pressure at the outside of the rear suspension 81 when the rear suspension 81 is compressed, air is sucked into the upper gas chamber 76 from the outside of the rear suspension 81. On the other hand, when the air pressure in the lower gas chamber 75 becomes smaller than the air pressure in the upper gas chamber 76 when the rear suspension 81 extends, air is supplied from the upper gas chamber 76 to the lower gas chamber 75. In addition, when the air pressure in the upper gas chamber 76 becomes more than the predetermined value (roughly 9 atm ($9 \times 1.013 \times 10^5$ Pa)), air is discharged from the upper gas chamber 76 to the outside of the rear suspension 81.

As described above, the piston 86 is moved in the axial direction of the rod 82 along the inner surface of the rod 82 when the rear suspension 81 extends or compresses. As a result, oil passes through the washers 86*c* and 86*d* of the piston 86, thereby generating damping force on the rear suspension 81. Accordingly, it is possible to effectively dampen the extension and compression of the rear suspension 81.

Furthermore, the other features and operations of the rear suspension of FIGS. 7 and 8 are the same as those of the rear suspension of FIGS. 1-6. In addition, the particular structures and operation of the rear suspensions disclosed herein are illustrative in all respects, and are not intended to limit the invention in any way. The scope of the invention is defined by the claims and not by the explanation of the above examples. Moreover, equivalents in scope to the claims and all modifications that fall within the scope of the claims are included in the invention.

For example, the above-described rear suspensions explain a motorcycle as one example of the vehicle provided with the suspension system. However, the invention is not limited to motorcycles, and so long as a vehicle is provided with the suspension system, the invention may be applied to other vehicles such as an automobile, a bicycle, a three-wheeled vehicle, or an ATV (All Terrain Vehicle).

In addition, in the above-described rear suspensions, examples are explained in which the invention is applied to a rear suspension as an example of the suspension system. However, the invention is not limited to this, and may be applied to a front suspension fork.

Moreover, in the above-described rear suspensions, examples are explained in which the air pressure adjustment valve is provided that functions such that, in the case that the air pressure in the upper gas chamber is more than roughly 9 atm ($9 \times 1.013 \times 10^5$ Pa) (the predetermined value), air is discharged from the upper gas chamber to the outside of the rear suspension in order to inhibit the air pressure in the upper gas chamber from becoming more than roughly 9 atm ($9 \times 1.013 \times 10^5$ Pa) (the threshold value). However, the invention is not limited to this, and the air pressure adjustment valve that inhibits the air pressure in the upper gas chamber from becoming more than the predetermined value need not be provided.

In addition, in the above-described arrangements, an example is described in which the adjustment screw is adjusted such that the air pressure in the upper gas chamber becomes roughly 9 atm ($9 \times 1.013 \times 10^5$ Pa) when the rear suspension is compressed. However, the invention is not limited to this and the adjustment screw may be adjusted such that the air pressure in the upper gas chamber becomes an air pressure that is different from 9 atm (9×1.013×105 Pa).

Moreover, in the above-described rear suspension of FIGS. 7 and 8, an example is explained in which the piston that structures the damping mechanism is provided inside the rod. However, the invention is not limited to this, and the piston that structures the damping mechanism may be provided outside of the rod, or the damping mechanism may be structured using a member other than a piston.

What is claimed is:

1. A vehicle comprising:
    a vehicle body;
    a vehicle wheel; and
    a shock absorber operably positioned between the vehicle body and the vehicle wheel; wherein
    the shock absorber comprises an air chamber containing air, and at least a first pressure adjustment valve that introduces air at atmospheric pressure into the air chamber from the atmosphere when air pressure in the air chamber is below a lower threshold value;
    the first pressure adjustment valve includes a first check valve including a spring arranged to automatically adjust the air pressure in the air chamber during extension and compression movement of the shock absorber;
    the air chamber includes a first air chamber that reduces in volume upon extension of the shock absorber and that increases in volume upon compression of the shock absorber, and a second air chamber that increases in volume upon extension of the shock absorber and that reduces in volume upon compression of the shock absorber; and
    the shock absorber further includes a third pressure adjustment valve arranged to discharge air from the first air chamber to the atmosphere when the air pressure in the first air chamber becomes larger than an upper threshold value as a result of air in the first air chamber being compressed upon extension of the shock absorber, and the third pressure adjustment valve is not coaxial with the first pressure adjustment valve.

2. The vehicle of claim 1, wherein the spring is a coil spring, and the coil spring is arranged to automatically allow the first check valve to open when the air pressure in the air chamber is below the lower threshold value.

3. The vehicle of claim 1, wherein the lower threshold value is approximately 1 atmosphere, and the spring in the first check valve is arranged to automatically introduce air into the air chamber when the air pressure in the air chamber is below 1 atmosphere.

4. The vehicle of claim 1, wherein the shock absorber comprises an outer tube member, a shaft member that is moveable within the outer tube member, and at least a first piston that is attached to the shaft member, and the first air chamber is defined by a space that is bounded by at least an inner surface of the outer tube member, an outer surface of the shaft member, and the first piston, and the second air chamber is defined by a space that is bounded by at least the inner surface of the outer tube member and the first piston.

5. The vehicle of claim 4, wherein the shaft member defines an oil chamber filled with oil, the shock absorber further comprises a second piston disposed within the oil chamber of the shaft member, and the second piston moves inside the oil chamber of the shaft member upon extension and compression of the shock absorber to generate a damping force.

6. The vehicle of claim 1, wherein the first air chamber is connected to the atmosphere by the first pressure adjustment valve.

7. The vehicle of claim 6, wherein air is introduced into the first air chamber from the atmosphere as a result of the air in the first air chamber expanding upon compression of the shock absorber.

8. The vehicle of claim 6, wherein the shock absorber further comprises a second pressure adjustment valve arranged to only supply air to the second air chamber from the first air chamber, and when air pressure in the second air chamber becomes less than the air pressure in the first air chamber as a result of expansion of the air in the second air chamber upon extension of the shock absorber, air is supplied from the first air chamber to the second air chamber by the second pressure adjustment valve.

9. The vehicle of claim 8, wherein the second air pressure adjustment valve of the shock absorber comprises a second check valve.

10. The vehicle of claim 1, wherein the third pressure adjustment valve of the shock absorber comprises a third check valve.

11. The vehicle of claim 1, wherein the third pressure adjustment valve includes an adjustment member arranged to adjust the upper threshold value of the air pressure at which air in the first air chamber is discharged from the first air chamber to the atmosphere by the third pressure adjustment valve.

12. The vehicle of claim 1, wherein the upper threshold value is approximately 9 atmospheres.

13. The vehicle of claim 1, wherein the shock absorber is a rear wheel suspension.

14. A vehicle comprising:
    a vehicle body;
    a vehicle wheel; and
    a shock absorber operably positioned between the vehicle body and the vehicle wheel, wherein
    the shock absorber comprises:
        a first portion;
        a second portion movable relative to the first portion, wherein the first portion and the second portion are arranged to define a first gas chamber and a second gas chamber, and the first gas chamber and the second gas chamber vary in volume as a result of relative movement of the first portion and the second portion of the shock absorber to provide a suspension spring force;
        at least a first pressure adjustment valve arranged to introduce a gas into the first gas chamber from a supply of gas other than the second gas chamber when pressure in the first gas chamber is below a lower threshold value;
        the first pressure adjustment valve includes a first check valve including a spring arranged to automatically adjust the pressure in the first gas chamber during extension and compression movement of the shock absorber; and
        a second pressure adjustment valve including a second check valve arranged to only supply gas to the second gas chamber from the first gas chamber, and when pressure in the second gas chamber becomes less than the pressure in the first gas chamber as a result of expansion of the gas in the second gas chamber upon extension of the shock absorber, gas is supplied from the first gas chamber to the second gas chamber by the second check valve;

wherein
the first gas chamber and the second gas chamber are arranged such that there is no back flow of gas from the second gas chamber to the first gas chamber; and
the shock absorber further includes a third pressure adjustment valve arranged to discharge gas from the first gas chamber when the pressure in the first gas chamber becomes larger than an upper threshold value.

15. A vehicle comprising:
a vehicle body;
a vehicle wheel; and
a shock absorber operably positioned between the vehicle body and the vehicle wheel; wherein
the shock absorber comprises an air chamber containing air, and at least a first pressure adjustment valve that introduces air at atmospheric pressure into the air chamber from the atmosphere when air pressure in the air chamber is below a lower threshold value;
the first pressure adjustment valve includes a first check valve including a spring arranged to automatically adjust the air pressure in the air chamber during extension and compression movement of the shock absorber;
the air chamber includes a first air chamber that reduces in volume upon extension of the shock absorber and that increases in volume upon compression of the shock absorber, and a second air chamber that increases in volume upon extension of the shock absorber and that reduces in volume upon compression of the shock absorber; and
the shock absorber further includes a third pressure adjustment valve arranged to discharge air from the first air chamber to the atmosphere when the air pressure in the first air chamber becomes larger than an upper threshold value as a result of air in the first air chamber being compressed upon extension of the shock absorber, and the third pressure adjustment valve is not coaxial with the first pressure adjustment valve.

* * * * *